(12) United States Patent
Mizuno (10) Patent No.: US 10,248,090 B2
(45) Date of Patent: Apr. 2, 2019

(54) TRACE DATA COLLECTION SYSTEM, CONTROLLER, MOTOR CONTROL DEVICE, OPERATION TERMINAL, AND TRACE DATA COLLECTION METHOD

(71) Applicant: Kabushiki Kaisha Yaskawa Denki, Kitakyushu-shi (JP)

(72) Inventor: Naoki Mizuno, Kitakyushu (JP)

(73) Assignee: Kabushiki Kaisha Yaskawa Denki, Kitakyushu-shi (JP)

(*) Notice: Subject to any disclaimer, the term of this patent is extended or adjusted under 35 U.S.C. 154(b) by 0 days.

(21) Appl. No.: 15/140,473

(22) Filed: Apr. 28, 2016

(65) Prior Publication Data

US 2016/0239009 A1 Aug. 18, 2016

Related U.S. Application Data

(63) Continuation of application No. PCT/JP2013/079947, filed on Nov. 5, 2013.

(51) Int. Cl.
| | | |
|---|---|---|
| G05B 19/042 | (2006.01) | |
| H02P 25/06 | (2016.01) | |
| G05B 19/4063 | (2006.01) | |
| G05B 19/409 | (2006.01) | |
| H02P 31/00 | (2006.01) | |

(52) U.S. Cl.
CPC ......... G05B 19/042 (2013.01); G05B 19/409 (2013.01); G05B 19/4063 (2013.01); H02P 25/06 (2013.01); H02P 31/00 (2013.01); G05B 2219/47 (2013.01); G05B 2219/50206 (2013.01)

(58) Field of Classification Search
USPC .............. 318/568.1, 636, 639, 400.08, 717
See application file for complete search history.

(56) References Cited

U.S. PATENT DOCUMENTS

| | | | | |
|---|---|---|---|---|
| 7,532,951 B2 * | 5/2009 | Sato | ........................ | G05D 19/02 700/170 |
| 7,949,422 B1 | 5/2011 | Little et al. | | |
| 2004/0153788 A1 * | 8/2004 | Krietemeyer | ...... | G05B 19/4063 714/25 |

(Continued)

FOREIGN PATENT DOCUMENTS

| | | | | |
|---|---|---|---|---|
| DE | 19614748 A1 * | 10/1997 | ......... | G05B 19/4184 |
| EP | 1669827 A2 | 6/2006 | | |

(Continued)

OTHER PUBLICATIONS

Search Report and the European Search Opinion dated Nov. 16, 2017, for corresponding EP Patent Application No. 13897100.7.

Primary Examiner — Jorge L Carrasquillo
(74) Attorney, Agent, or Firm — HEA Law PLLC (57) ABSTRACT

Provided is a trace data collection system, including: a controller including: a trace start signal transmission determination unit configured to determine a condition for transmitting a trace start signal; and a trace start signal transmission unit configured to transmit the trace start signal; and a motor control device including: a trace start signal reception unit configured to receive the trace start signal; a trace start determination unit configured to set at least reception of the trace start signal as a trace start condition; and a first trace data collection unit configured to collect first trace data relating to a motor.

9 Claims, 9 Drawing Sheets (56) References Cited

U.S. PATENT DOCUMENTS

| | | | | |
|---|---|---|---|---|
| 2007/0135957 A1* | 6/2007 | Ogawa | ............ | G05B 17/02 |
| | | | | 700/109 |
| 2012/0116582 A1* | 5/2012 | Negishi | ............ | B25J 9/161 |
| | | | | 700/245 |
| 2012/0250478 A1* | 10/2012 | Onoe | ............ | G11B 7/005 |
| | | | | 369/47.14 |

FOREIGN PATENT DOCUMENTS

| | | | |
|---|---|---|---|
| JP | H03-117387 A | | 5/1991 |
| JP | 2001-005504 A | | 1/2001 |
| JP | 2004-173141 A | | 6/2004 |
| JP | 2004173141 A | * | 6/2004 |
| JP | 2006-004195 A | | 1/2006 |
| JP | 2006004195 A | * | 1/2006 |
| JP | 2006-115587 A | | 4/2006 |
| JP | 2006115587 A | * | 4/2006 |
| JP | 2007-114862 A | | 5/2007 |
| JP | 2007114862 A | * | 5/2007 |
| JP | 2007-318899 A | | 12/2007 |
| JP | 2007-328562 A | | 12/2007 |
| WO | 2009/008235 A1 | | 1/2009 |

\* cited by examiner

TRACE DATA COLLECTION SYSTEM, CONTROLLER, MOTOR CONTROL DEVICE, OPERATION TERMINAL, AND TRACE DATA COLLECTION METHOD

INCORPORATION BY REFERENCE

The present disclosure contains subject matter related to that disclosed in International Patent Application PCT/JP2013/079947 filed in the Japan Patent Office on Nov. 5, 2013, the entire contents of which are hereby incorporated by reference.

BACKGROUND OF THE INVENTION

Field of the Invention

The present invention relates to a trace data collection system, a controller, a motor control device, an operation terminal, and a trace data collection method.

Description of the Related Art

In JP H03-117387 A, there is disclosed a loaded state display device configured to write, when a key switch of a setting display is pressed, a motor current value of a servo control device to a memory of a positioning device, and to calculate a motor peak current based on the motor current value stored in the memory.

SUMMARY OF THE INVENTION

According to one aspect of the present invention, there is provided a trace data collection system, including: a motor control device configured to control a motor; and a controller configured to control the motor control device, the controller including: a trace start signal transmission determination unit configured to determine a condition for transmitting a trace start signal; and a trace start signal transmission unit configured to transmit the trace start signal, the motor control device including: a trace start signal reception unit configured to receive the trace start signal; a trace start determination unit configured to set at least reception of the trace start signal as a trace start condition; and a first trace data collection unit configured to collect, when the trace start condition is satisfied, first trace data relating to the motor.

Further, according to one aspect of the present invention, there is provided a controller, including: a trace start signal transmission determination unit configured to determine a condition for transmitting a trace start signal; and a trace start signal transmission unit configured to transmit the trace start signal.

Further, according to one aspect of the present invention, there is provided a motor control device, including: a trace start signal reception unit configured to receive a trace start signal;

a trace start determination unit configured to set at least reception of the trace start signal as a trace start condition; and a trace data collection unit configured to collect trace data relating to a motor.

Further, according to one aspect of the present invention, there is provided an operation terminal, including: a graph display unit configured to display as a graph at least second trace data collected by a controller; and a trace start condition setting unit configured to set, on the graph of the second trace data, a condition for starting collection of first trace data to be collected by a motor control device.

Further, according to one aspect of the present invention, there is provided a trace data collection method, including the steps of: determining, by a controller, a condition for transmitting a trace start signal; transmitting, by the controller, the trace start signal; receiving, by a motor control device, the trace start signal; determining, by the motor control device, a trace start based on reception of the trace start signal as a trace start condition; and collecting, by the motor control device, when the trace start condition is satisfied, first trace data relating to a motor.

DESCRIPTION OF THE EMBODIMENTS

From the perspective of the inventor of the present invention, during a series of operations by a mechanical system that uses a motor, there may be a need to collect trace data of the motor at a specific timing. In this case, when collecting the trace data by a motor control device, because the control cycle of the motor control device is short (in general, about several tens to several hundreds of µs), detailed data of a short measurement interval is obtained. On the other hand, because the capacity of the memory mounted in the motor control device is not very large, the period for which the trace data can be obtained is short. As a result, it is difficult to precisely collect the trace data at the required timing.

In view of this, the trace data may also be collected by a controller configured to issue operating commands to the motor control device. In this case, because the memory mounted in the controller has a relatively large capacity, the period for which the trace data can be obtained is longer, and it is comparatively easier to collect the trace data at the required timing. However, because the control cycle of the controller is long (in general, about several hundred µs to several ms), the measurement interval lengthens. As a result, it is impossible to obtain detailed data.

Further, when trace data is collected on each of a plurality of motors, because the relative positions in time among the pieces of trace data are unknown, it is difficult to simultaneously compare and review those pieces of trace data.

As a result of extensive research and development regarding how to collect detailed trace data at a desired timing, and how to enable a plurality of pieces of trace data to be simultaneously compared and reviewed, the inventor of the present invention has conceived of a novel and creative trace data collection system. The trace data collection system and the like are now described in detail by way of an embodiment thereof.

<Trace Data Collection System According to Embodiment of Present Invention>

Figure 1:
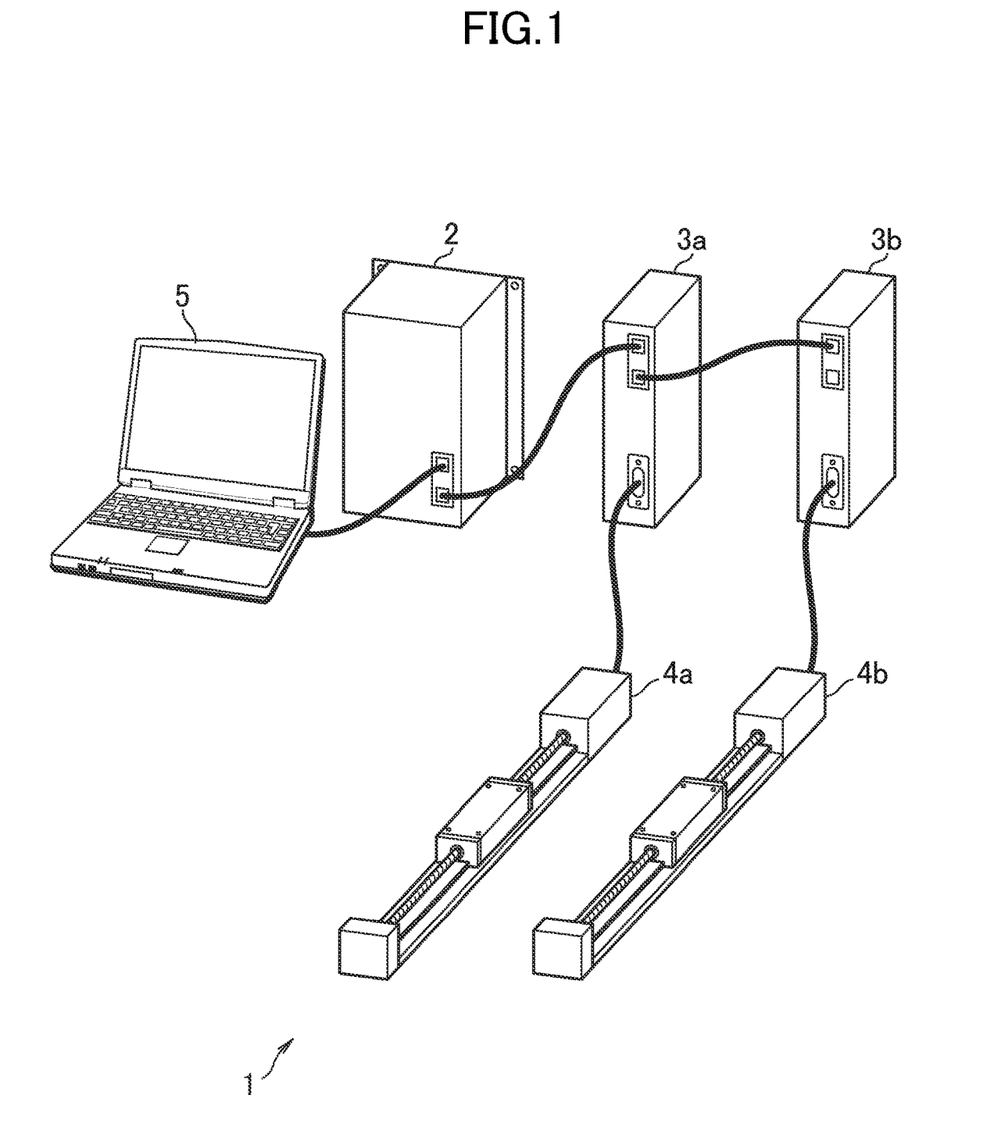
FIG. 1 is a schematic diagram for illustrating an example of a trace data collection system including a controller according to an embodiment of the present invention.

FIG. 1 is a schematic diagram for illustrating an example of a trace data collection system 1 according to an embodiment of the present invention. In FIG. 1, a controller 2, motor control devices 3a and 3b, motors 4a and 4b (in FIG. 1, the motors 4a and 4b are illustrated as a drive source for a linear slider), and an operation terminal 5 are illustrated.

The controller 2 is a machine configured to control various mechanical elements, including the motor control devices 3a and 3b. The controller 2 is configured to execute predetermined operations on the various mechanical elements connected to the controller 2 by executing arbitrary mechanical control programs, for example, ladder programs and time charts. In general, the controller 2 may be a machine known as a programmable logic controller (PLC), a sequencer, or a motion controller.

The motor control devices 3a and 3b are machines having integrated control circuits and amplifiers for supplying power in order to operate the motors 4a and 4b. In this case, the form of the motors 4a and 4b is not particularly limited. However, in this embodiment, the motors 4a and 4b are servo motors, and the motor control devices 3a and 3b are machines that in general are known as servo controllers or servo amplifiers.

The operation terminal 5 is an information processing device configured to receive an input from a user and transmit the received input to the controller 2, and to acquire information from the controller 2 and display the acquired information to the user. Applications that are necessary for a common personal computer may be installed in the operation terminal 5 as appropriate.

The various machines configuring the trace data collection system 1 are connected to each other in the manner illustrated in FIG. 1. The operation terminal 5 and the controller 2 may be connected only when it is necessary. The operation terminal 5 and the controller 2 do not need to be connected at all times. Further, the connection between the operation terminal 5 and the controller 2 does not need to be a direct connection. In addition, the connection between the controller 2 and the motor control devices 3a and 3b also does not need to be a direct connection. The connection between the operation terminal 5 and the controller 2, and the connection between the controller 2 and the motors 4a and 4b, may be a connection via a suitable network, and may be a wired or a wireless connection.

Figure 2:
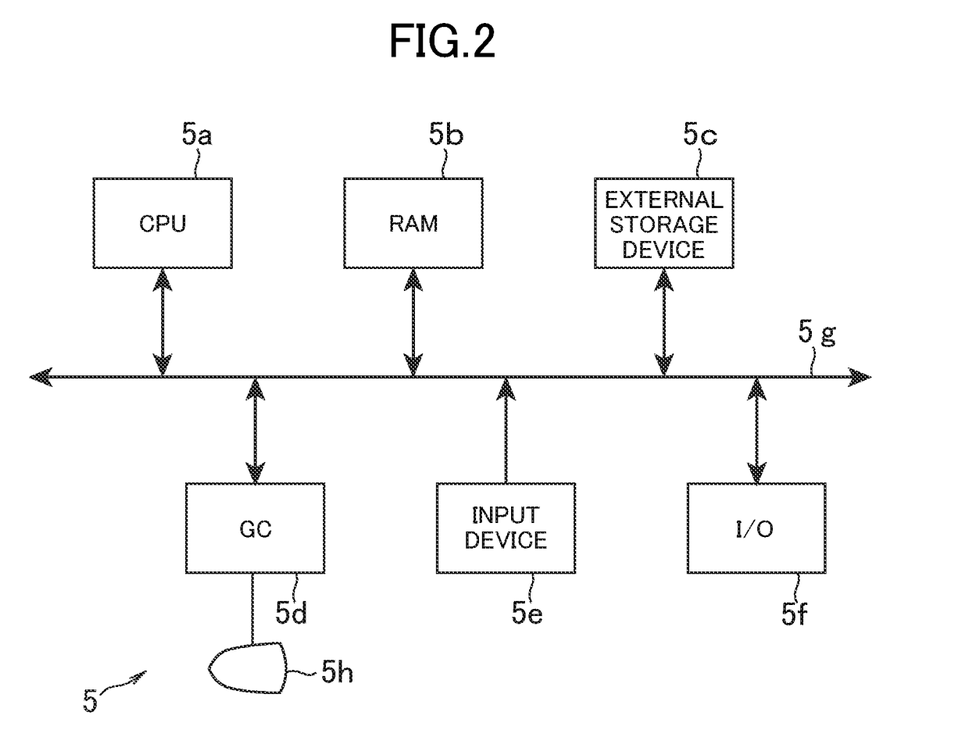
FIG. 2 is a block diagram for illustrating a physical configuration of an operation terminal.

FIG. 2 is a block diagram for illustrating a physical configuration of the operation terminal 5. The operation terminal 5 is a typical computer, in which a central processing unit (CPU) 5a, a random-access memory (RAM) 5b, an external storage device 5c, a graphics controller (GC) 5d, an input device 5e, and an input/output (I/O) 5f are connected by a data bus 5g in a manner that allows electric signals to be exchanged to and from each other. In this case, the external storage device 5c is a device capable of statically recording information, such as a hard disk drive (HDD) and a solid-state drive (SDD). Further, a signal from the GC 5d is output to a monitor 5h, such as a cathode ray tube (CRT) or a so-called flat panel display, configured to enable the user to visually recognize images. The output signal is displayed on the monitor 5h as an image. The input device 5e is a device that enables the user to input information, such as a keyboard, a mouse, or a touch panel. The I/O 5f is an interface that enables the operation terminal 5 to exchange information with an external machine, which in this example is the controller 2. Applications to be executed by the operation terminal 5 are installed in the external storage device 5c, read in the RAM 5b as necessary, and executed by the CPU 5a.

Note that, in the above descriptions, FIG. 1, and FIG. 2, descriptions and illustrations of other detailed components and wirings, for example, connections of a power source line and a ground line, which are unnecessary for the description of this embodiment, are omitted for the sake of simplicity. Further, no particular limitations are imposed on a connection mode, a connector type, the type or number of devices to be controlled, or the like, and a wide variety of modifications are conceivable.

Figure 3:
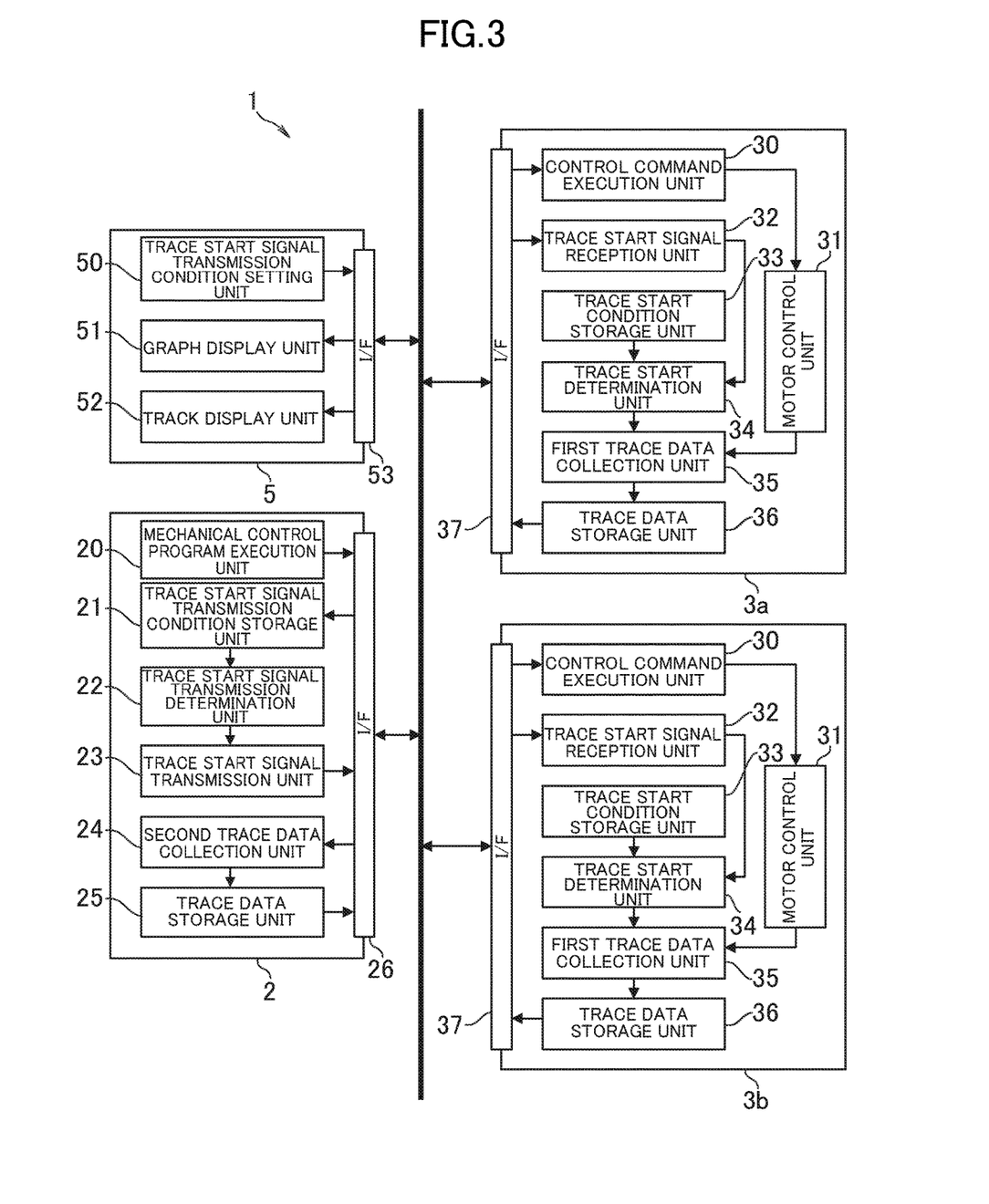
FIG. 3 is a function block diagram of the trace data collection system.

FIG. 3 is a function block diagram of the trace data collection system 1.

The controller 2 includes a mechanical control program execution unit 20 configured to execute a mechanical control program, a trace start signal transmission condition storage unit 21, a trace start signal transmission determination unit 22, a trace start signal transmission unit 23, a second trace data collection unit 24, a trace data storage unit 25, and an interface 26.

The motor control devices 3a and 3b each include a control command execution unit 30, a motor control unit 31, a trace start signal reception unit 32, a trace start condition storage unit 33, a trace start determination unit 34, a first trace data collection unit 35, a trace data storage unit 36, and an interface 37.

In addition, the operation terminal 5 includes a trace start signal transmission condition setting unit 50, a graph display unit 51, a track display unit 52, and an interface 53.

Each function block illustrated in FIG. 3 is virtually realized by, mainly, executing a predetermined program on an information processing device, such as a processor, mounted in each machine illustrated in FIG. 3, and allocating an area in which predetermined information is to be stored in a memory mounted in each machine. Each of the machines illustrated in FIG. 3 is individually illustrated by focusing on the functions that the machine has.

The mechanical control program execution unit 20 is configured to execute a mechanical control program, such as a ladder program and a time chart, and to transmit a control command to each machine based on the instructions in the mechanical control program. The trace data collection system 1 performs intended operations as a whole based on each machine operating in accordance with the control commands.

The trace start signal transmission condition storage unit 21 is configured to store a trace start signal transmission condition, which is a condition for transmitting to the motor control devices 3a and 3b a signal instructing a trace start. The trace start signal transmission condition is set by the trace start signal transmission condition setting unit, which is described later, in the operation terminal 5.

The trace start signal transmission determination unit 22 is configured to determine whether or not the trace start signal transmission condition stored in the trace start signal transmission condition storage unit 21 is satisfied, and when it is determined that the trace start signal transmission condition is satisfied, command the trace start signal transmission unit 23 to transmit a trace start signal.

The trace start signal transmission unit 23 is configured to transmit, in response to a command from the trace start signal transmission determination unit 22, a trace start signal to the motor control devices 3a and 3b to start a trace. The trace at the motor control devices 3a and 3b is started based on the trace start signal as a trigger.

In this case, trace refers to an operation for collecting trace data. Trace data, which is information on a motor, is a collection of information changing over time obtained for a predetermined period. For example, the trace data may be information on a position, a speed, a difference from a command value, an electric current value, and the like of the motor. The position and the speed of the motor may be information on a rotation angle of the motor shaft, or may be the position and the speed of a slider coupled to the motor shaft. When the motor is a linear motor, the position and the speed of the motor are the position and the speed of the slider per se. Note that, as described later, trace data includes first trace data collected at the motor control devices 3a and 3b and second trace data collected at the controller 2.

The second trace data collection unit 24 is configured to collect trace data relating to a specified motor, and to store the collected trace data as second trace data in the trace data storage unit 25. The second trace data collection unit 24 may be configured to collect a single piece of second trace data, or to simultaneously collect a plurality of pieces of second trace data.

The trace data storage unit 25 is configured to store the second trace data collected by the second trace data collection unit 24.

The control command execution unit 30 is configured to operate the motor by issuing an appropriate command to the motor control unit 31 based on a control command transmitted by the mechanical control program execution unit 20.

The motor control unit 31, which includes necessary electrical circuits in addition to an amplifier for driving the motor, is configured to control the power to be input to the motor based on the command from the control command execution unit 30 and to drive the motor as intended.

The trace start signal reception unit 32 is configured to receive the trace start signal transmitted by the trace start signal transmission unit 23, and to transfer the received trace start signal to the trace start determination unit 34.

A trace start condition, which is a condition for starting a trace by the motor control devices 3a and 3b, is stored in the trace start condition storage unit 33. In the trace start condition storage unit 33, at least the fact that the trace start signal is received from the controller 2 is stored as a condition.

The trace start determination unit 34 is configured to determine whether or not the trace start condition stored in the trace start condition storage unit 33 is satisfied, and when it is determined that the condition is satisfied, cause the first trace data collection unit 35 to start a trace. When a plurality of trace start conditions are stored in the trace start condition storage unit 33, any one or a plurality of those trace start conditions may be selected to be used. The selection of the trace start condition may be performed based on a specification by the user made via the operation terminal 5.

The first trace data collection unit 35 is configured to collect the trace data specified from the motor control unit 31, and to store the collected trace data as first trace data in the trace data storage unit 36. Further, the first trace data collection unit 35 may also be configured to collect a single piece of first trace data, or to simultaneously collect a plurality of pieces of first trace data.

The trace data storage unit 36 is configured to store the first trace data collected by the first trace data collection unit 35.

In this case, the trace data is, in general, a collection of specific detection values measured for each fixed cycle. The cycle depends on the operating cycle of the machine for which trace data is to be collected. Further, because the first trace data is collected by the motor control devices 3a and 3b, which have a short control cycle, the first trace data is detailed trace data for a short measurement interval. However, the measurement period is short because the amount of data per unit time is large, and because the trace data storage unit 36 does not have a large capacity. On the other hand, the second trace data is collected by the controller 2, which has a long control cycle. Thus, although the measurement interval is longer than that of the first trace data, and the level of detail of the trace data is less, the measurement period is long.

The trace start signal transmission condition setting unit 50 is configured to set the trace start signal transmission condition to be stored in the trace start signal transmission condition storage unit 21. Specifically, the trace start signal transmission condition setting unit 50 may be configured to display a suitable graphical user interface (GUI) on the monitor 5h of the operation terminal 5 to enable the user to enter appropriate inputs from the input device 5e.

The graph display unit 51 is configured to display the trace data on the monitor 5h as a graph by plotting the trace data on the time axis. The trace data used in this case may be any one, or both, of the first trace data stored in the trace data storage unit 36 and the second trace data stored in the trace data storage unit 25. However, in this embodiment, both the first trace data and the second trace data are used.

The track display unit 52 is configured to display a track of the trace data on the monitor 5h by assigning and plotting a plurality of pieces of trace data on each of a plurality of intersecting axes. The axis that each piece of trace data is to be assigned to may be selected as appropriate by the user. Note that, due to the display design, the number of axes that may be used is two or three. When two axes are used, the display is two dimensional, and when three axes are used, the display is three dimensional. However, in the case of a three-dimensional display, the track displayed on the monitor 5h may be freely rotated for display by a suitable operation.

<Trace Data Collection Flow by Trace Data Collection System>

Next, a flow of collecting the trace data by the trace data collection system 1 according to this embodiment is described with reference to FIG. 4 to FIG. 9. Note that, in the following description, reference is made to FIG. 3 as appropriate.

Figure 4:
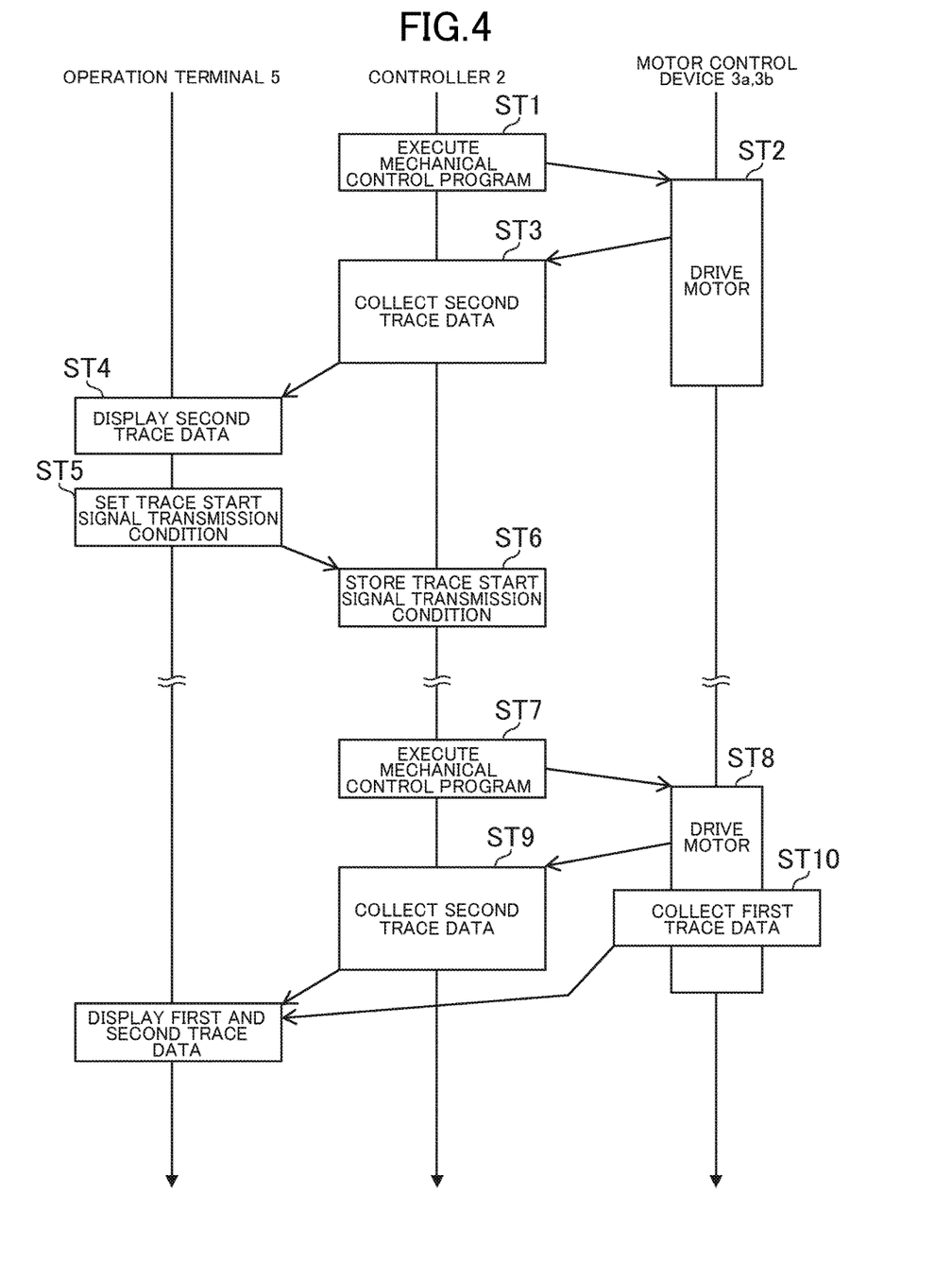
FIG. 4 is a flow chart of trace data collection.

FIG. 4 is a flow chart of trace data collection. First, the mechanical control program execution unit 20 in the controller 2 executes a mechanical control program (Step ST1). Execution of the mechanical control program may be performed by external input of an appropriate signal to the controller 2, or based on an instruction issued by operating the operation terminal 5. As a result, the motor control devices 3a and 3b perform the determined operation, and the motor is driven (Step ST2).

In addition, the second trace data collection unit 24 of the controller 2 collects second trace data while the motor is being driven, and stores the collected second trace data in the trace data storage unit 25 (Step ST3). The start timing for the second trace data may be arbitrarily set. For example, the start timing for the second trace data may be the same time as the execution of the mechanical control program, a predetermined time after the start timing for the execution of the mechanical control program, or set based on an arbitrary signal, a parameter change, or a user instruction. However, it is desired that essentially the same data be obtained even when the second trace data is repeatedly collected. For that reason, it is desired that the start timing for the second trace data be automatically determined.

When the second trace data has been collected, the second trace data stored in the trace data storage unit 25 is transmitted to the operation terminal 5 and displayed by the graph display unit 51 (Step ST4), and the trace start signal transmission condition is set by the trace start signal transmission condition setting unit 50. The set trace start signal transmission condition is stored in the trace start signal transmission condition storage unit 21 of the controller 2 (Step ST5).

Figure 5:
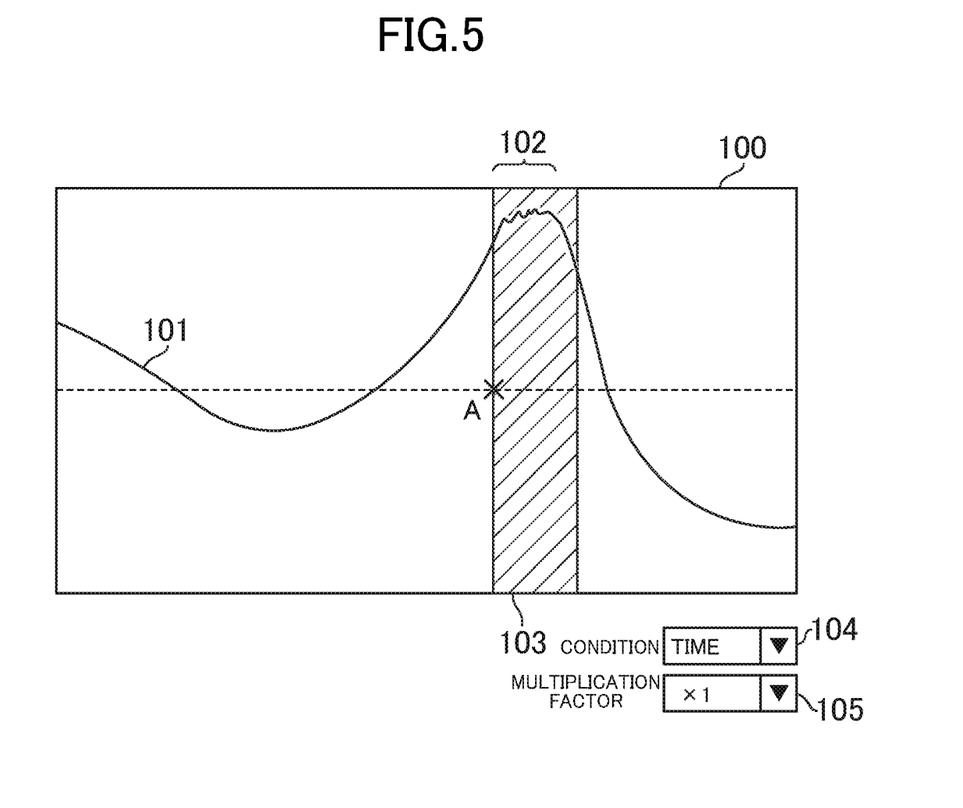
FIG. 5 is a diagram for showing how second trace data is displayed by a graph display unit.

FIG. 5 is a diagram for showing how second trace data is displayed by the graph display unit 51. Collected second trace data 101 is plotted in a graph display area 100 shown in FIG. 5. In this case, the horizontal axis represents time, and the vertical axis represents, as an example, speed.

In this case, the trace start signal transmission condition setting unit 50 is configured to set the trace start signal transmission condition on the graph. In the example shown in FIG. 5, an oscillation occurs in the speed of the motor in a portion 102 of the second trace data 101. Assuming that it is desirable to obtain more detailed trace data of this portion, a period 103 in which the first trace data is collected is shown on the graph by using an appropriate input device to specify a timing (A in FIG. 5) for starting to collect the first trace data. The condition at this point is displayed based on the collection start of the second trace data 101, namely, based on the time from the collection start point.

The condition that may be set by the trace start signal transmission condition setting unit 50 is not limited to time, and another condition may be set. As a result, as shown in FIG. 5, a condition specification field 104 for specifying the condition is included. In this case, the condition specification field 104 is a so-called "pull-down menu", from which a suitable condition may be selected from among the available conditions. Further, a width of the period 103, which is equal to the period for which the first trace data can be collected, may be varied. In addition, the maximum value of this period is determined based on the sampling cycle of the first trace data and the capacity of the memory in the motor control devices 3a and 3b. The most detailed first trace data can be obtained when the sampling cycle of the data matches the control cycle of the motor control devices 3a and 3b. However, the sampling cycle may be varied as necessary. For example, when the sampling cycle of the data is set to be an integer multiple of the control cycle, although the level of detail of the first trace data decreases, the collection period may be lengthened. In FIG. 5, a multiplication factor specification field 105 for specifying the multiplication factor of the sampling cycle with respect to the control cycle is included, which enables the sampling cycle to be varied.

Figure 6:
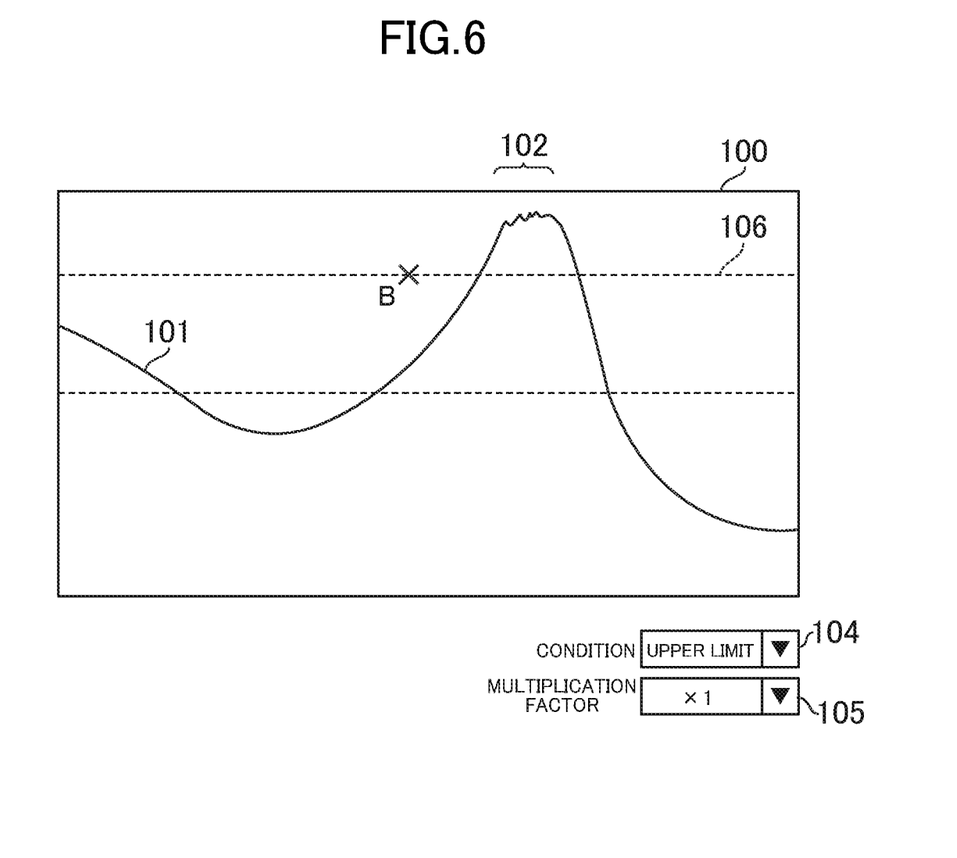
FIG. 6 is a diagram for showing an example in which a trace start signal transmission condition different from that shown in FIG. 5 has been set in a graph by a trace start signal transmission condition setting unit.

FIG. 6 is a diagram for showing an example in which a trace start signal transmission condition different from that shown in FIG. 5 has been set in a graph by the trace start signal transmission condition setting unit 50. In this example, an "upper limit" is set in the condition specification field 104. The upper limit is a condition meaning that the first trace data is collected when the first trace data exceeds a specified threshold. The threshold, which is determined by specifying an arbitrary position in the graph, such as a point B, for example, is indicated in the graph by a dashed line 106. Similarly, a condition that the first trace data be collected when the first trace data is less than a specified threshold may be set by specifying a "lower limit". When an upper limit and a lower limit are set, those conditions are expressed in terms of the magnitude of the value of the collected second trace data 101.

The trace start signal transmission condition is not limited to the timing shown in FIG. 5 (time from collection start point) and the thresholds for the upper and lower limits and the like of a trace target shown in FIG. 6. Various conditions may be used as the trace start signal transmission condition. For example, the motor position may also be used. However, when the timing is used as the condition, for example, because this allows the start condition to be unambiguously determined, the collection of trace data for an unintended period can be prevented, and, a plurality of pieces of first trace data can be synchronized with each of a plurality of motor control devices.

Returning again to FIG. 4, when the mechanical control program is again executed (Step ST7), the motor is driven (Step ST8), and the second trace data is again collected (Step ST9). Then, the trace start signal transmission determination unit 22 determines that the trace start signal transmission condition is satisfied during collection of the second trace data, and a trace start signal is transmitted by the trace start signal transmission unit 23. As a result, the trace start determination unit 34 in each of the motor control devices 3a and 3b determines that the trace start signal is received by the trace start signal reception unit 32 and thus the trace start condition is satisfied. The first trace data is then collected by the first trace data collection unit 35 (Step ST10), and stored in the trace data storage unit 36.

At this stage, the collection period of the first trace data and the collection period of the second trace data overlap. As a result, the second trace data is at least collected during collection of the first trace data.

The collected first trace data and second trace data are transmitted to the operation terminal 5, and displayed by the graph display unit 51 (Step ST11). At this stage, the first trace data and the second trace data are displayed in the graph on the same time axis.

Figure 7:
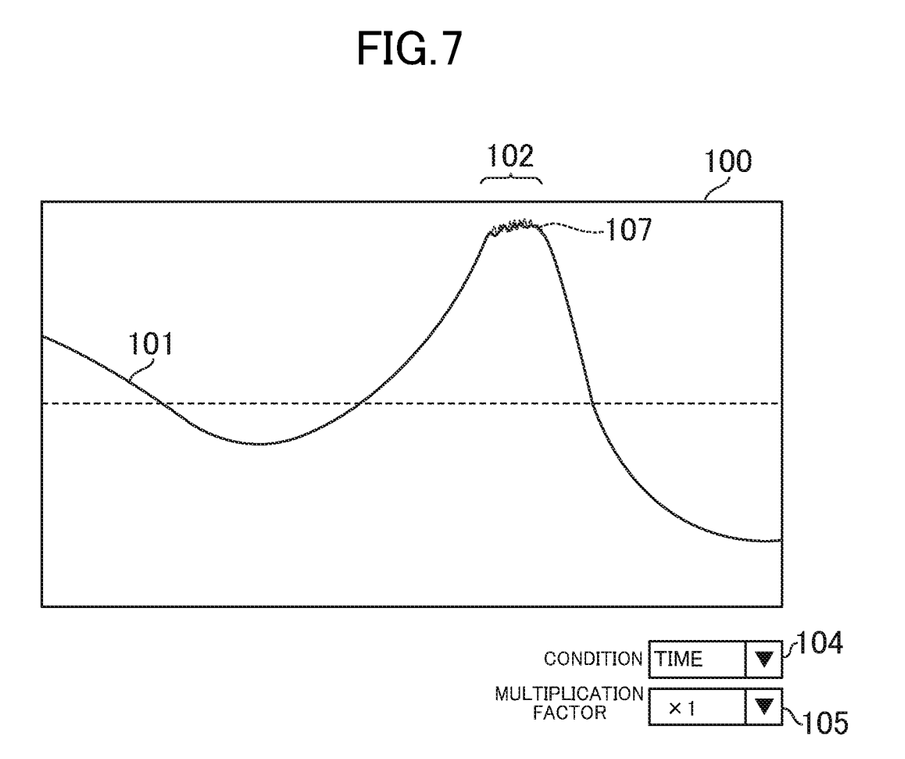
FIG. 7 is a diagram for showing how first trace data and second trace data are simultaneously displayed by the graph display unit.

FIG. 7 is a diagram for showing how the first trace data and the second trace data are simultaneously displayed by the graph display unit 51. The second trace data is indicated by a solid line 101. The first trace data collected in the portion 102 is indicated by a dashed line 107. The first trace data and the second trace data are plotted along the same time axis.

In order to display the first trace data and the second trace data on the same time axis, a relative position relating to the time between the first trace data and the second trace data needs to be determinable. The relative position may be determined by any method. For example, the relative position can be easily determined by recording the time of the start time of the first trace data from the start time of the second trace data.

Further, it is desired that the graph display unit 51 be capable of displaying an appropriate portion of the plotted graph in an enlarged manner.

Figure 8:
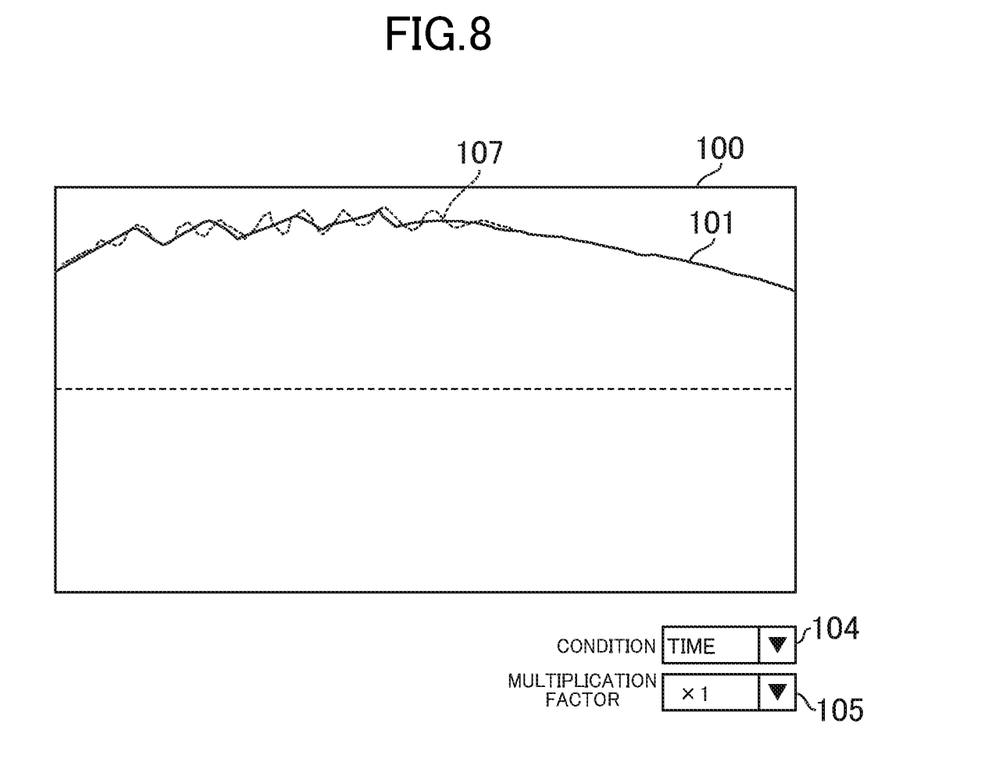
FIG. 8 is an example in which a portion shown in FIG. 7 is displayed in an enlarged manner.

FIG. 8 is an example in which the portion 102 shown in FIG. 7 is displayed in an enlarged manner. Displaying a plot 101 of the second trace data on the same time axis as a plot 107 of the first trace data in this manner enables a detailed trace data waveform, which is not known based only on the second trace data, to be observed.

In the above description, the second trace data is again collected as described in Step ST9 when the first trace data is collected in Step ST10. This is performed in order to detect the condition for starting to collect the first trace data, and also because, due to the effects of disturbances and the like acting on the trace data collection system 1 when the second trace data is repeatedly collected, the same second trace data is not necessarily obtained. Collecting the second trace data at the same time as collecting the first trace data enables the collection of first trace data and second trace data that correctly correspond to each other.

Therefore, there is a substantial increase in user-friendliness for the user using the trace data. In other words, with the trace data collection system 1 according to this embodiment, based on the second trace data, the user can grasp from a comparatively rough measurement interval the state of the motor during a measurement time in which the operation of the actual machine used by the motor is reflected. Subsequently, during this measurement time, the user can easily specify the particular operation period for which the state of the motor needs to be grasped in detail. In addition, the user can grasp the detailed state of the motor in the specified operation period based on the first trace data. Normally, because the processes are not liked to each other, the user grasps each of those states based on iterative processing and inference. However, with the trace data collection system 1 according to this embodiment, those processes can be seamlessly and reliably executed.

In order to facilitate understanding of the description, the description up to this point has been based on the assumption that there is one piece of first trace data and one piece of second trace data. However, a plurality of pieces of first trace data and a plurality of pieces of second trace data may be collected. The plurality of pieces of trace data obtained in such a case may be plotted on the time axis by the graph display unit 51, or may be displayed as a track by the track display unit 52. Not only when such a plurality of pieces of trace data are plotted on the time axis, but also when plurality of pieces of trace data are displayed as a track, the same effects as described above, such as enabling the plurality of pieces of first trace data and the plurality of pieces of second trace data to correctly correspond to each other for tracing, may be obtained. The advantageous effects gained when the plurality of pieces of trace data are displayed as a track are now described below.

Figure 9:
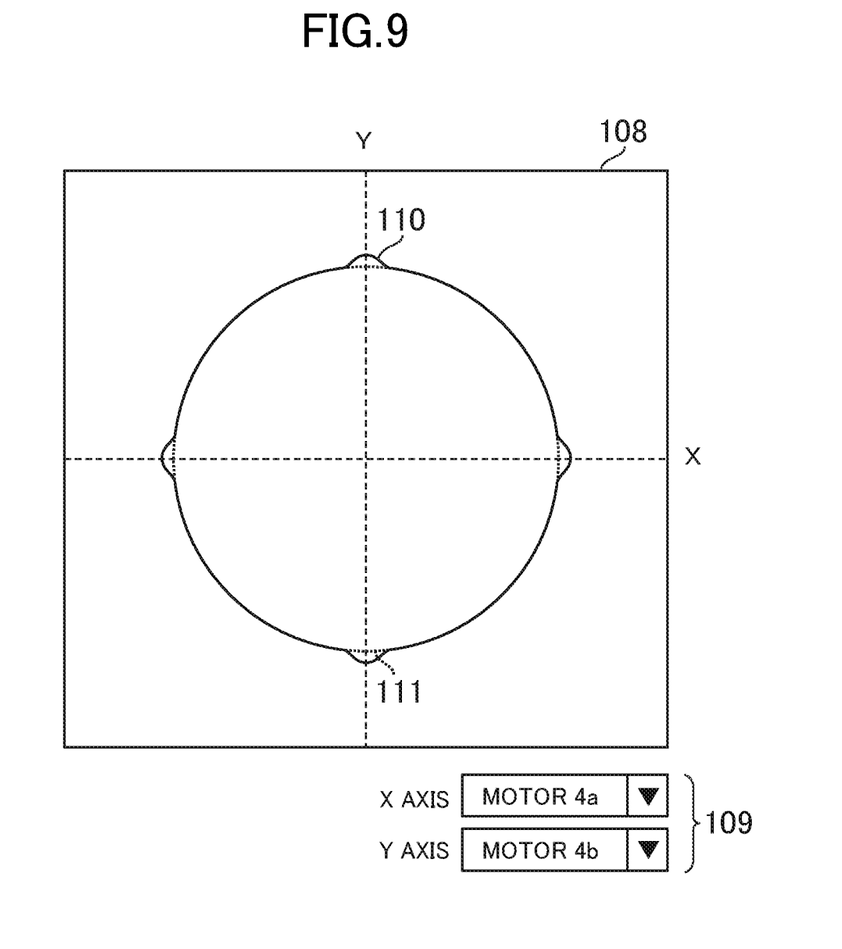
FIG. 9 is a diagram for showing how a track is displayed by a track display unit.

FIG. 9 is a diagram for showing how the track is displayed by the track display unit 52. In a track display area 108 shown in FIG. 9, a plurality of intersecting axes, in this case, an X axis and a Y axis orthogonal to each other, are shown. Further, the trace data to be assigned to each axis may be selected by using a display data selection field 109. In this case, the display data selection field 109 is a so-called "pull-down menu", from which the trace data collected up to this point may be selected.

In the example shown in FIG. 9, the position of the motor 4a is selected on the X axis, and the position of the motor 4b is selected on the Y axis. Further, the motors 4a and 4b are each orthogonally arranged with respect to each other so as to operate an XY stage. Those operations are intended to be performed in a circular motion.

At this stage, a track 110 such as that shown in FIG. 9 is drawn by assigning different trace data to the axes intersecting each other, and plotting the coordinates on the track display unit 52 determined based on the trace data with respect to time. How accurately the actual operations of the motors 4a and 4b follow the intended operations can be easily verified from the track 110. In the example shown in FIG. 9, it can be verified that positional deviation occurs at positions at which the track 110 intersects the X axis and the Y axis.

Note that, as indicated by a dotted line 111 in FIG. 9, when the tracks of the control target values are shown together, the precision of the actual operations of the motors 4a and 4b can be clearly verified.

In this case, the track displayed by the track display unit 52 is shown in two dimensions as a track based on two axes. However, the track may be displayed in three dimensions by adding another axis. In such a case, the track is plotted in a three-dimensional space, and it is preferred that the track be observable by freely rotating the track on the screen through a suitable operation with respect to the operation terminal 5.

In other words, it should be understood by those skilled in the art that various modifications, combinations, sub-combinations and alterations may occur depending on design requirements and other factors insofar as they are within the scope of the appended claims or equivalents thereof.

What is claimed is:

1. A trace data collection system, comprising:
a motor control device configured to drive a motor and collect a first set of trace motor data;
an operation terminal; and
a controller in communication with the motor control device, the controller configured to execute a mechanical control program, transmit a control command to the motor control device based on instructions in the mechanical control program, and collect a second set of trace motor data from the motor control device,
wherein the controller comprises:
  a trace start signal transmission determination unit configured to determine a condition for when to transmit a trace start signal to the motor control device to start collecting the first set of trace motor data;
  a trace start signal transmission unit configured to transmit the trace start signal to the motor control device instructing the motor control device to start collecting the first set of trace motor data; and
  a second trace data collection unit configured to collect the second set of trace motor data while the motor is being driven,
wherein the operation terminal comprises:
  a graph display unit configured to display as a graph, at least the second set of trace motor data; and
  a trace start signal transmission condition setting unit configured to set the condition for transmitting the trace start signal on the graph of the second set of trace motor data,
wherein the motor control device comprises:
  a control command execution unit configured to operate the motor based on the control command received from the mechanical control program;
  a trace start signal reception unit configured to receive the trace start signal sent from the trace start signal transmission unit;
  a trace start determination unit configured to determine if a trace start signal has been received; and
  a first trace data collection unit configured to collect the first set of trace motor data after it is determined that the trace start signal has been received from the controller,
wherein
  the trace start signal transmission determination unit is configured to use a time relationship between the first set of trace motor data and the second set of trace motor data, as the condition for transmitting the trace start signal to the motor control device,
  the motor control device is configured to control power to be input to the motor based on the command received from the mechanical control program to drive the motor, the first set of trace motor data is more detailed than the second set of trace motor data.

2. The trace data collection system according to claim 1, wherein the trace start signal transmission determination unit is configured to determine the condition for transmitting the trace start signal based on at least any one of a time from the collection start point of the second set of trace motor data and a value of the collected second set of trace motor data.

3. The trace data collection system according to claim 1, wherein the second trace data collection unit is configured to collect the second set of trace motor data during a same time as collection of the first set of trace motor data by the first trace data collection unit.

4. The trace data collection system according to claim 1, wherein the graph display unit is configured to display as a graph, the first set of trace motor data and the second set of trace motor data on a same time axis.

5. The trace data collection system according to claim 1, wherein the motor control device is a plurality of motor control devices and the trace start signal transmission unit is configured to transmit the trace start signal to the plurality of motor control devices.

6. The trace data collection system according to claim 1, wherein the operation terminal further comprises:
a track display unit configured to assign part of the first set of trace motor data and part of the second set of trace motor data to a plurality of intersecting axes, and to display a track of the assigned trace data.

7. The trace data collection system according to claim 1, wherein a control cycle of the controller is longer than a control cycle of the motor control device.

8. A trace data collection method, comprising:
determining, by a controller, a condition for transmitting a trace start signal to a motor control device;
transmitting, by the controller, the trace start signal to the motor control device, the motor control device configured to drive a motor;
collecting, by the controller, a second set of trace motor data received from the motor control device while the motor is being driven;
receiving, by a motor control device, the trace start signal sent from the controller;
determining, by the motor control device, when to start collecting the first set of trace motor data based on the reception of the trace start signal from the controller; and
collecting, by the motor control device, the first set of trace motor data after it is determined that the trace start signal has been received from the controller;
wherein the operation terminal comprises:
displaying, by an operation terminal, at least the second set of trace motor data on a graph; and
setting, by the operation terminal, the condition for transmitting the trace start signal on the graph of the second set of trace motor data, wherein
the motor control device uses a time relationship between the first set of trace motor data and the second set of trace motor data as the condition for transmitting the trace start signal to the motor control device,
the motor control device is configured to control power to be input to the motor based on a command received from the control lerto drive the motor, and
the first set of trace motor data is more detailed than the second set of trace motor data, and
a collecting period of the first set of trace motor data and a collecting period of the second set of trace motor data overlap.

9. The trace data collection method according to claim 8, wherein a control cycle of the controller is longer than a control cycle of the motor control device.

* * * * *